(12) United States Patent
Wang et al.

(10) Patent No.: US 10,784,814 B2
(45) Date of Patent: Sep. 22, 2020

(54) SUPPORT APPARATUS FOR PHOTOVOLTAIC MODULE AND PHOTOVOLTAIC SYSTEM

(71) Applicant: SUNGROW POWER SUPPLY CO., LTD., Hefei (CN)

(72) Inventors: Yukun Wang, Hefei (CN); Fuqin Xiao, Hefei (CN); Weiwu Wu, Hefei (CN); Kui Zong, Hefei (CN); Hao Wu, Hefei (CN); Guojing Chen, Hefei (CN); Bin Wu, Hefei (CN); Zhigang Lv, Hefei (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 102 days.

(21) Appl. No.: 16/048,806

(22) Filed: Jul. 30, 2018

(65) Prior Publication Data

US 2019/0341880 A1 Nov. 7, 2019

(30) Foreign Application Priority Data

May 3, 2018 (CN) .................... 2018 2 0655251 U (51) Int. Cl.
*H02S 20/30* (2014.01)
*F24S 20/70* (2018.01)
*H02S 30/00* (2014.01)

(52) U.S. Cl.
CPC .............. *H02S 20/30* (2014.12); *F24S 20/70* (2018.05); *H02S 30/00* (2013.01)

(58) Field of Classification Search
None
See application file for complete search history.

(56) References Cited

U.S. PATENT DOCUMENTS 9,132,889 B2   9/2015 Veloso et al.
9,184,693 B2   11/2015 Yun et al.
(Continued)

FOREIGN PATENT DOCUMENTS

CN   203775114 U   8/2014
CN   206939010 U   1/2018
(Continued)

OTHER PUBLICATIONS

Indian Office Action regarding Application No. 201814028515 dated Dec. 6, 2019.
(Continued)

*Primary Examiner* — Shannon M Gardner
(74) *Attorney, Agent, or Firm* — Harness, Dickey & Pierce, P.L.C.

(57) ABSTRACT

A support apparatus for a photovoltaic module and a photovoltaic system are provided. The support apparatus for a photovoltaic module is to be arranged on a water surface, and includes: a support body for mounting the photovoltaic module; and a floating body connected to the support body and configured to provide buoyancy for the support apparatus. A connection function for providing connection with the photovoltaic module and a buoyancy function for providing the buoyancy are separated. The support body having the connection function may be used for providing only connection with the photovoltaic module and not for providing buoyancy. In manufacturing and installation processes, it is unnecessary for the support body to be watertight, thus the manufacturing process of the support body may be greatly simplified, and the manufacturing cost can be reduced.

18 Claims, 11 Drawing Sheets

(56) References Cited

U.S. PATENT DOCUMENTS

| | | | |
|---|---|---|---|
| 2012/0090667 A1* | 4/2012 | Cap | B63B 35/38 |
| | | | 136/251 |
| 2012/0305051 A1* | 12/2012 | Kokotov | B63B 21/50 |
| | | | 136/246 |
| 2014/0224165 A1 | 8/2014 | Veloso et al. | |
| 2015/0162866 A1 | 6/2015 | Yun et al. | |

FOREIGN PATENT DOCUMENTS

| | | |
|---|---|---|
| JP | JP-H11301578 A | 11/1999 |
| KR | 101109184 B1 | 2/2012 |
| KR | 20140037068 A | 3/2014 |
| KR | 20150018341 A | 2/2015 |
| KR | 20150100249 A | 9/2015 |
| KR | 101770957 B1 | 8/2017 |
| WO | WO-2012139998 A2 | 10/2012 |
| WO | WO-2017189108 A1 | 11/2017 |

OTHER PUBLICATIONS

Korean Office Action regarding Application No. 20-2018-0003726 dated Dec. 24, 2019. English translation provided by Unitalen Attorneys at Law.

\* cited by examiner

SUPPORT APPARATUS FOR PHOTOVOLTAIC MODULE AND PHOTOVOLTAIC SYSTEM

This application claims the priority to Chinese Patent Application No. 201820655251.7, titled "SUPPORT APPARATUS FOR PHOTOVOLTAIC MODULE AND PHOTOVOLTAIC SYSTEM", filed on May 3, 2018 with the State Intellectual Property Office of the People's Republic of China, which is incorporated herein by reference in its entirety.

FIELD

The present disclosure relates to the technical field of photovoltaic power generation, and in particular to a support apparatus for a photovoltaic module and a photovoltaic system.

BACKGROUND

A photovoltaic power generation system arranged on a water surface needs a support apparatus for providing buoyancy for photovoltaic modules. In addition to providing buoyancy, a conventional support apparatus also provides connection with photovoltaic modules. When manufacturing such support apparatus, it is required to consider settings of the buoyancy support, the strength and the connection position, and the like, resulting in a complex manufacturing process and a high manufacturing cost.

Therefore, it is a technical issue to be solved by those skilled in the art to provide a support apparatus which can be made by a simple manufacturing process.

SUMMARY

A support apparatus for a photovoltaic module and a photovoltaic system are provided according to the present disclosure, where a support body of the support apparatus for the photovoltaic module does not provide buoyancy, thus water tightness is not considered when manufacturing the support body, resulting in a simple manufacturing process and a low manufacturing cost.

In order to solve the above technical issue, a support apparatus for a photovoltaic module is provided according to the embodiment of the present disclosure. The support apparatus for a photovoltaic module is to be arranged on a water surface, and includes: a support body for mounting the photovoltaic module; and a floating body connected to the support body and configured to provide buoyancy for the support apparatus.

In the support apparatus for a photovoltaic module according to the present disclosure, a connection function for connecting the photovoltaic module and a buoyancy function for providing buoyancy are provided separately. The support body having the connection function provides only connection with the photovoltaic module and does not provide buoyancy. Therefore, the support body is not required to be watertight in manufacturing and installation, which can greatly simplify the manufacturing process of the support body, and reduce the manufacturing cost.

In addition, the floating body provides only buoyancy and does not need to function as a connector. Therefore, the manufacturing process of the floating body can be greatly simplified and the manufacturing cost can be greatly reduced.

Preferably, the support body may be provided with multiple through holes extending through the support body in a vertical direction.

Preferably, a front surface and a back surface of the photovoltaic module may be used for photovoltaic power generation, where in use, sunlight at least passes through the multiple through holes, is incident on a water surface and reflected by the water surface, and is incident on the back surface of the photovoltaic module; or in use, the support body is immersed in water, and sunlight is incident on the water surface and reflected by the water surface to the back surface of the photovoltaic module.

Preferably, the support body and/or the floating body may be provided with a reflective coating.

Preferably, the support body may include a support frame and a multiple reinforcement beams arranged in the support frame, the multiple through holes are formed between the multiple reinforcement beams and between the multiple reinforcement beams and edge beams of the support frame.

Preferably, the support body may not be used for providing buoyancy.

Preferably, the support frame and the multiple reinforcement beams may be in an integrated structure.

Preferably, the edge beam of the support frame may be provided with a reinforcement structure.

Preferably, one of an upper surface and a lower surface of the support frame may be provided with a positioning protrusion, the other one of the upper surface and the lower surface of the support frame may be provided with a positioning groove corresponding to the positioning protrusion; in a case where multiple support bodies are stacked, the positioning protrusion of one of two adjacent support bodies is inserted in the positioning groove of the other one of the two adjacent support bodies.

Preferably, the support apparatus for a photovoltaic module may further include a support assembly, where the support assembly is arranged on the support body and configured to position the photovoltaic module above the water surface.

Preferably, the floating body may include a housing including a sealed buoyancy cavity; and a support structure configured to support an upper wall of the housing.

Preferably, in use, the support body may be immersed into water.

A photovoltaic system is provided, which includes a photovoltaic module; and the above support apparatus, where the photovoltaic module is mounted on the support apparatus.

Since the above technical effects can be achieved with the support apparatus for a photovoltaic module, similar technical effects can also be achieved with the photovoltaic system having the support apparatus for a photovoltaic module, which is not described in detail herein.

Preferably, multiple support bodies and multiple floating bodies which form a grid-shaped support array may be provided, where rows of the grid-shaped support array includes the multiple support bodies, and columns of the grid-shaped support array includes the multiple floating bodies; and a column of the floating bodies forms a maintenance channel.

Preferably, each row of the support bodies connected between two columns of the floating bodies may include at least two support bodies which are connected in series.

The reference numbers shown in FIGS. 1-14 is as follows:

1 support body, 11 support frame, 111 reinforcement structure, 112 positioning protrusion, 113 positioning groove, 12 reinforcement beam, 13 first connection position, 14 second connection position, 15 first process hole;

2 floating body, 21 top support component, 22 floating body connection position, 23 second process hole, 24 anti-slipping structure;

3 photovoltaic module;

4 support assembly, 41 first support plate, 42 second support plate, 43 securing frame;

5 double coupler, 51 sub-connector, 52 third process hole;

A through hole.

DETAILED DESCRIPTION OF EMBODIMENTS

In order to make those skilled in the art better understand technical solutions of the present disclosure, the present disclosure will be described in detail hereinafter in conjunction with the drawings and in specific embodiments.

The "plurality of" or "multiple" mentioned in the present disclosure refers to an uncertain number, which is generally more than two. In a case that "plurality of" or "multiple" is used to represent the numbers of different components, it does not mean that the numbers are the same.

The "first", "second", "third" or the like in the present disclosure is only used to facilitate description of two or more configurations or components with the same or similar structure, and does not intent to limit an order.

Figure 1:
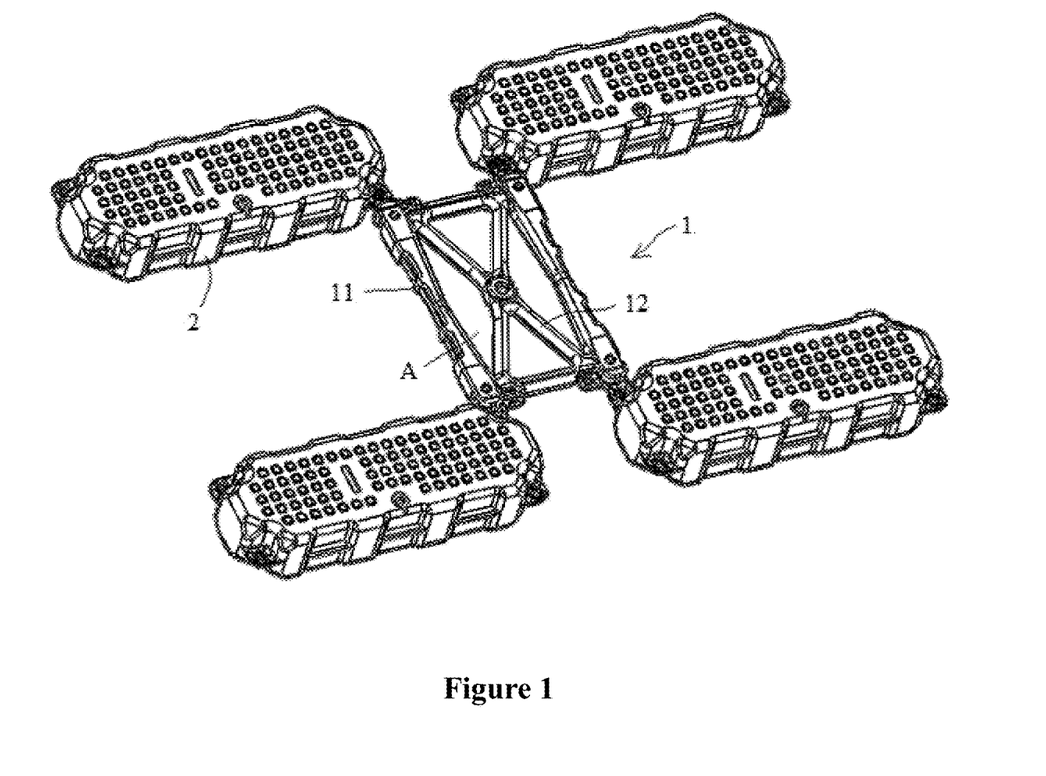
FIG. 1 is a schematic structural diagram of a support apparatus for a photovoltaic module according to an embodiment of the present disclosure.
Figure 1A:
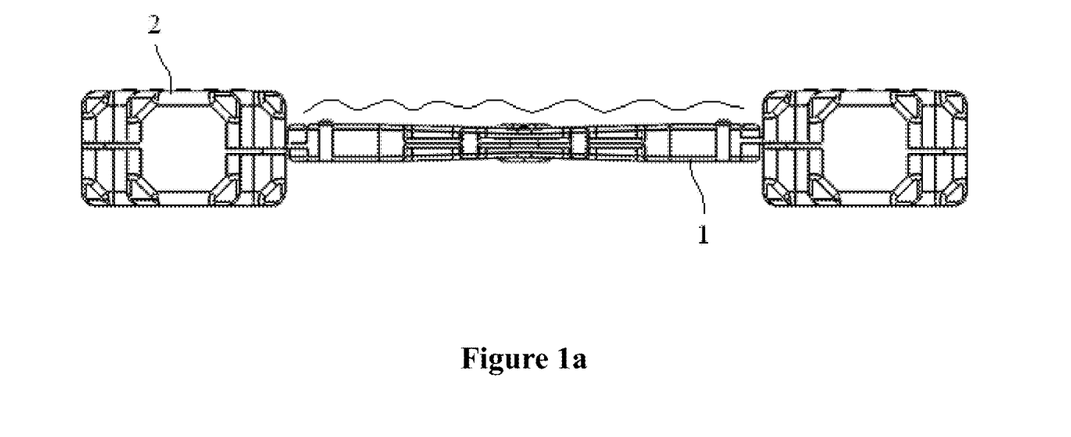
FIG. 1a is a schematic diagram illustrating a use state of the support apparatus shown in FIG. 1.
Figure 2:
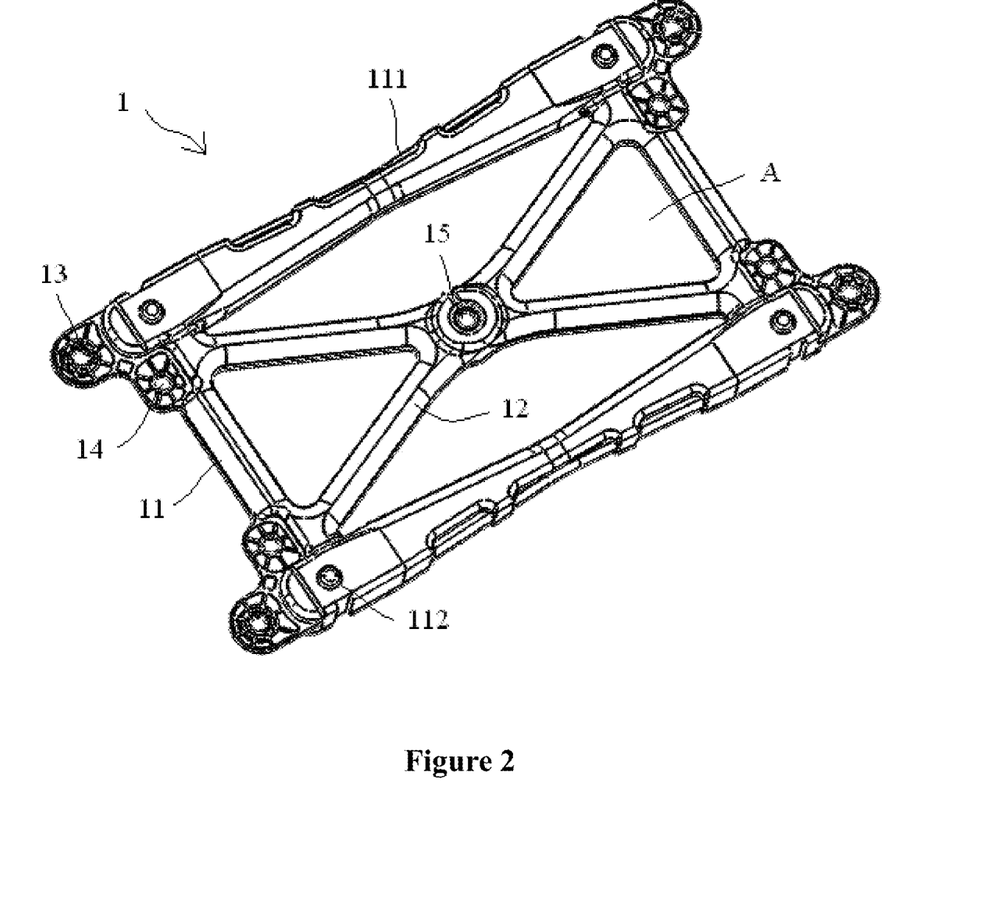
FIG. 2 is a schematic structural diagram of a support body at one viewing angle.
Figure 3:
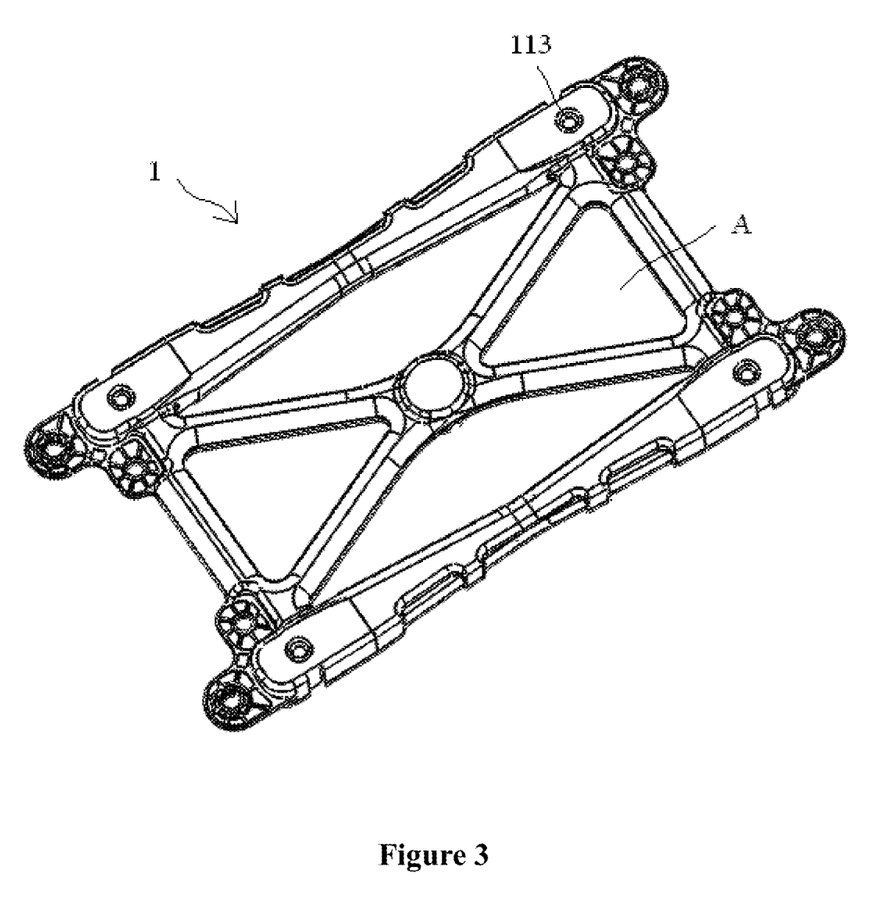
FIG. 3 is a schematic structural diagram of a support body at another viewing angle.
Figure 4:
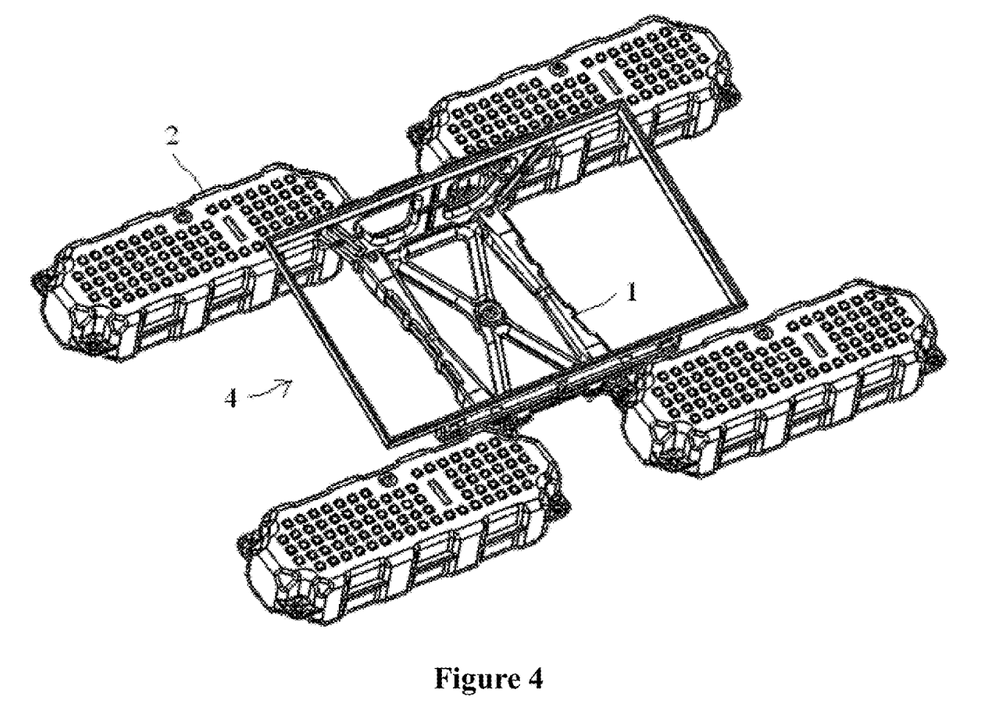
FIG. 4 is a schematic structural diagram of a support body provided with a support assembly.
Figure 5:
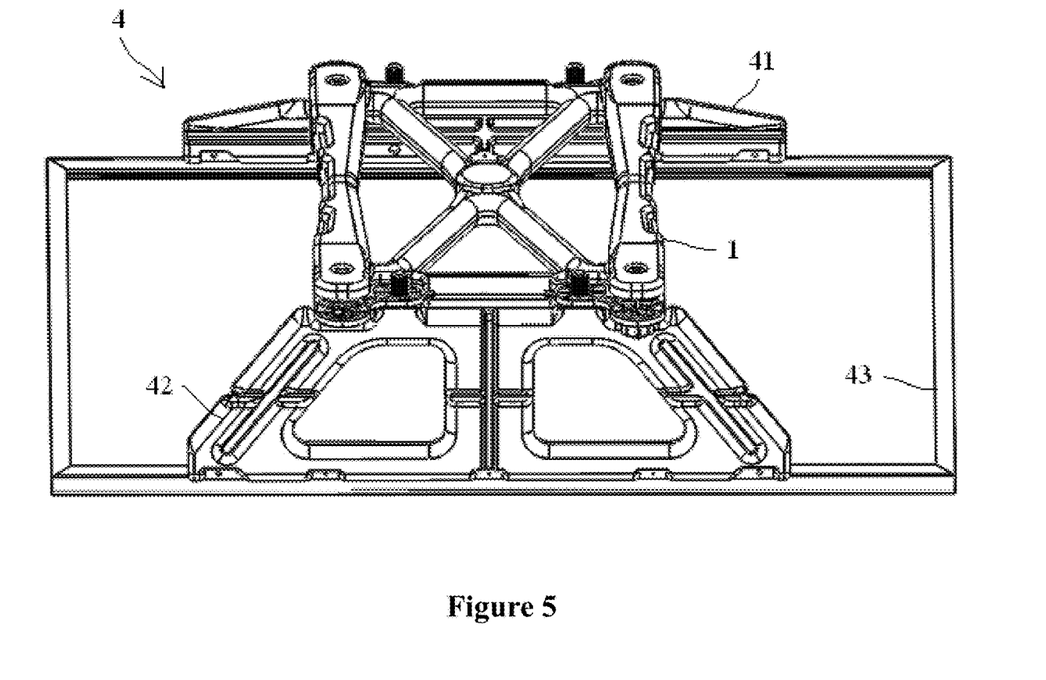
FIG. 5 is a schematic structural diagram illustrating connection between a support assembly and a support body.
Figure 6:
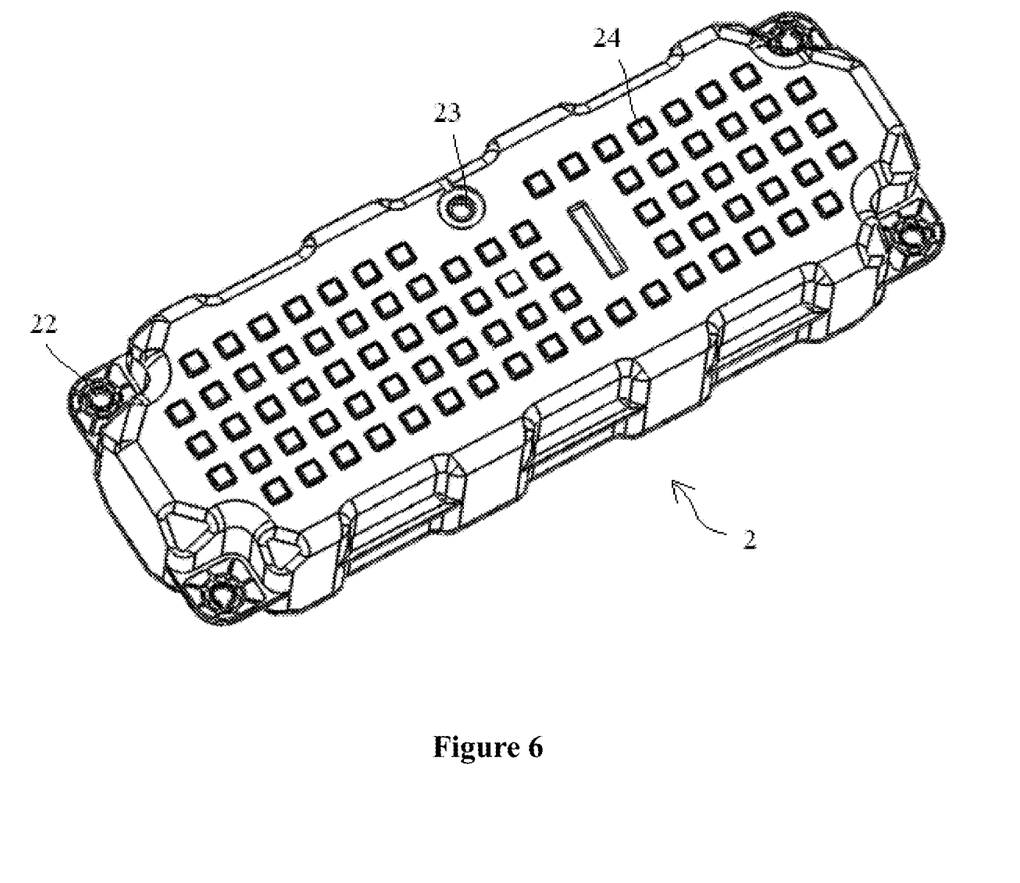
FIG. 6 is a schematic structural diagram of a floating body at one viewing angle.
Figure 7:
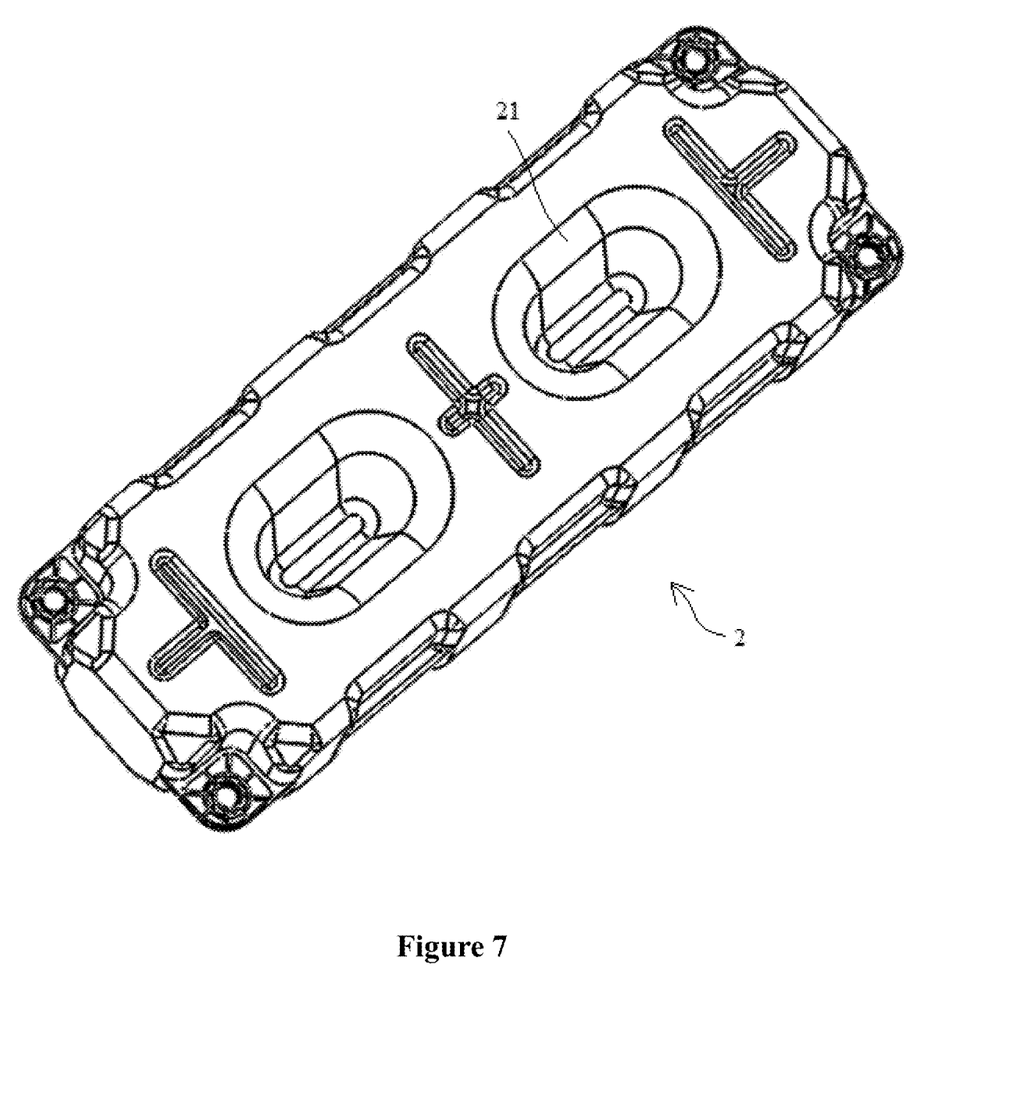
FIG. 7 is a schematic structural diagram of a floating body at another viewing angle.
Figure 8:
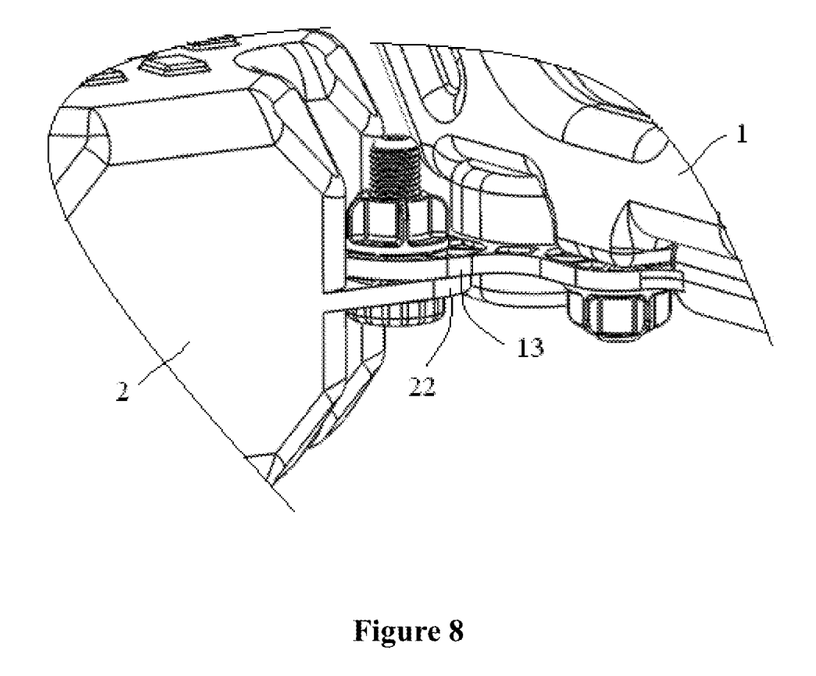
FIG. 8 is a partially enlarged view of a connection portion between a support body and a floating body.

Reference is made to FIGS. 1-8, FIG. 1 is a schematic structural diagram of a support apparatus for a photovoltaic module according to an embodiment of the present disclosure. FIG. 1a is a schematic diagram illustrating the support apparatus shown in FIG. 1 which is in use. FIG. 2 is a schematic structural diagram of a support body at one viewing angle. FIG. 3 is a schematic structural diagram of a support body at another viewing angle. FIG. 4 is a schematic structural diagram of a support body provided with a support assembly. FIG. 5 is a schematic structural diagram illustrating connection between a support assembly and a support body. FIG. 6 is a schematic structural diagram of a floating body at one viewing angle. FIG. 7 is a schematic structural diagram of a floating body at another viewing angle. FIG. 8 is a partially enlarged view of a connection portion between a support body and a floating body.

As shown in FIG. 1, a support apparatus for a photovoltaic module 3 is provided according to the present disclosure. The support apparatus for a photovoltaic module is to be arranged on a water surface and includes: a support body 1 and a floating body 2, where the floating body 2 is connected to the support body 1 to provide buoyancy for the support apparatus. The photovoltaic module 3 is arranged on the support body 1 which is not used for providing buoyancy. The above water surface may be a lake surface, a river surface and a sea surface, or the like.

What is different from the conventional technology is that, in the embodiment of the present disclosure, a connection function for providing connection with the photovoltaic module 3 and a buoyancy function for providing the buoyancy are separated. The support body 1 having the connection function may be used for providing only connection with the photovoltaic module 3 and not for providing buoyancy. In manufacturing and installation processes, it is unnecessary for the support body 1 to be watertight, such that the manufacturing process of the support body 1 can be greatly simplified, and the manufacturing cost can be reduced. In addition, the floating body 2 provides only buoyancy and does not need to function as a connector, in which case it is unnecessary to provide a connection position on the floating body 2. Therefore, the manufacturing process of the floating body 2 may be simplified, thereby by further reducing the cost of the support apparatus according to the present disclosure.

The support body 1 not providing buoyancy indicates that, in a case where the support body 1 is individually placed on the water surface, the gravity of the support body 1 may be greater than buoyancy received by the support body 1. That is, the support body 1 does not provide buoyancy, in which case the support body 1 may be a metal component having a high density. Alternatively, in a case where the support body 1 is made of a light weight material such as plastic, the buoyancy received by the support body 1 may be greater than the gravity of the support body 1, and the support body 1 may be positioned above the water surface and do not contact with the water surface. In this case, the support body does not participate in providing buoyancy.

The embodiment of the present disclosure does not exclude the technical solution that the support body 1 is also used for providing buoyancy. In practice, the support body 1 may assist in providing buoyancy. That is, the buoyancy received by the support body 1 being greater than the gravity of the support body 1 and the support body 1 being in contact with the water surface is also an alternative solution of the support apparatus according to the present disclosure, in which case, a burden of the floating body 2 may be reduced, thus reducing the volume of the floating body 2 and reducing the space occupied by an installed support apparatus.

It should be understood that a principle of the present disclosure is to separately provide the buoyancy function and the connection function. When manufacturing the support body 1, only a connection reliability of the support body is to be considered. Whether the support body is used for providing buoyancy may be or may not be taken into consideration, and both cases are included in the present disclosure. In this way, design and manufacturing of the support body 1 may be significantly simplified, and the support body 1 is not necessarily made of a material or a structure of which the gravity is greater than the received buoyancy. In addition, only the buoyancy function is to be considered in design and manufacturing of the floating body 2. The floating body 2 may have a cavity structure or may be made of a light weight material such as foam or plastic, which is determined based on actual conditions.

What is more important is that both a front surface and a back surface of the photovoltaic module 3 arranged on the support body 1 can be used for photovoltaic power generation. That is, both surfaces of the photovoltaic module 3 may be used for power generation. The support body 1 is provided with multiple through holes A extending through the support body 1 in a vertical direction. When in use, sunlight at least passes through the multiple through holes A, is incident on a water surface and reflected by the water surface, and is incident on the back surface of the photovoltaic module 3 through the multiple through holes A so that the back surface of the photovoltaic module 3 can also receive the sunlight. In this case, both the front surface and the back surface of the photovoltaic module 3 can perform photovoltaic power generation. Utilization of the sunlight is increased, and the photovoltaic power generation amount can be increased. In addition to the through holes A, sunlight may also be reflected by a water surface between the support body 1 and the floating body 2 which is not covered by the photovoltaic module 3, and is incident on the back surface of the photovoltaic module 3 for photovoltaic power generation.

The above "front surface" indicates a surface of a photovoltaic panel of the photovoltaic module 3 that faces the sunlight, and the "back surface" indicates a surface opposite to the front surface of the photovoltaic panel. Generally, especially when used on land, the ground is not reflective, and the back surface of the photovoltaic panel cannot receive the sunlight. Therefore, the conventional photovoltaic power generation device generally generates power by using only the front surface of the photovoltaic module 3 which absorbs sunlight. The above "vertical", which is an axial direction of the through holes A, is not necessarily the absolute vertical direction, and may also be a direction at a certain angle relative to the absolute direction, as long as sunlight can reach the water surface through the through holes A, be reflected and incident on the back surface of the photovoltaic module 3 through the through holes A.

In addition to facilitating power generation of both surfaces of the photovoltaic module 3, heat exchange between the photovoltaic module 3 and the water surface can also be increased by using the through holes A, thereby enhancing cooling of the photovoltaic module 3 and reducing a working temperature of the photovoltaic module 3, thus the photovoltaic power generation efficiency can be increased.

In another embodiment, as shown in FIG. 1a, a wavy line in FIG. 1 represents the water surface. In use, the support body 1 can be completely immersed into water due to its own gravity and a pressure from the photovoltaic module 3. In this case, sunlight can directly reach the water surface, be reflected by the water surface, and incident on the back surface of the photovoltaic module 3 so as to increase the amount of reflected sunlight and improve the efficiency of the power generation of the back surface of the photovoltaic module 3. In addition, the heat exchange between the photovoltaic module 3 and the water surface may be further improved. In this case, the support body may be or may not be provided with the above through holes A. In the present disclosure, the scheme where the through holes A are provided is preferable, since on one hand, a weight of the support body 1 can be reduced to decrease the demand for buoyancy, on the other hand, immersion of the support body 1 into water is facilitated.

Furthermore, the support body 1 and/or the floating body 2 may be provided with a reflective coating. A reflectivity of the reflective coating is greater than reflectivity of the surfaces of the support body 1 and the floating body 2, such that the amount of reflected sunlight can be increased, so as to further increase the amount of the generated photovoltaic power. The reflective coating is not limited to the upper surfaces of the support body 1 and the floating body 2. The reflective coating may be provided on side surfaces of the support body 1 and the floating body 2, depending on an actual use condition.

In a specific scheme, the support body 1 may have a frame structure, as shown in FIGS. 2 and 3, the support body 1 may include a support frame 11, and multiple reinforcement beams 12 may be arranged in the support frame 11 so as to improve the strength of the support body 1. The number and the arrangement of the above reinforcement beams 12 are not limited in the present disclosure. The above through holes A may be formed between the reinforcement beams 12 and/or between the reinforcement beams 12 and edge beams of the support frames 11. Alternatively, the support body 1 may have a plate shape, and the above through holes A may be formed on the support body 1 by a process such as cutting. In this case, the technical effect of facilitating reflection of sunlight can also be achieved.

The through holes A may be circular holes, square holes, triangle holes or other irregularly-shaped holes, as long as sunlight can reach the water surface though the through holes A, be reflected and incident on the back surface of the photovoltaic module 3 through the through holes A.

The frame structure of the above support body 1 may be formed by separated components, and may be formed by combining the edge beams and the reinforcement beams 12 by ways of clamping, jointing, welding, or by using connectors. Alternatively, the frame structure of the above support body 1 may be an integrated structure. That is, the support frame 11 and the reinforcement beams 12 may be integrally formed by a process such as integral injection molding or hollow blow molding. In the case of hollow blow molding, a first process hole 15 may be remained on the support body 1. In use, the first process hole 15 may be sealed with a sealing component to prevent entry of water or air. Of course, considering that the support body 1 may not be used for providing buoyant, the first process hole 15 may not be sealed.

The edge beam of the support frame 11 may be provided with a reinforcement structure 111 so as to improve the strength of the support frame 11. The reinforcement structure 111 may be a reinforcement rib mounted on the edge beam of the support frame 11 by welding after the support frame 11 is fabricated. Alternatively, the reinforcement structure 111 and the support frame 11 may also be integrally formed, in which case the reinforcement structure 111 may be a concave or convex structure arranged on the edge beam for improving the bending and torsional resistance capacities of the corresponding edge beam, thereby protecting the support body 1 from damage due to an impact from water and the like.

One of an upper surface and a lower surface of the support frame 11 may be provided with a positioning protrusion 112, and the other one of the upper surface and the lower surface of the support frame 11 may be provided with a positioning groove 113 corresponding to the positioning protrusion 112. During transport, multiple support bodies 1 may be stacked vertically, and the positioning protrusion 112 of one of two adjacent support bodies 1 can be inserted into the positioning groove 113 of the other one of the two adjacent support bodies 1 so as to limit a relative displacement of the two support bodies 1, such that movement of each of the stacked support bodies 1 during transport can be avoided, thus guaranteeing the stability of the support bodies 1 during transport.

It should be understood that the positioning protrusion 112 and the positioning groove 113 may not be provided, and in this case, the support bodies 1 can be maintained in a neat stack by means of location limiting components such as ropes and location limiting plates, so as to facilitate the transportation.

Reference is made to FIG. 2, four corners of the support frame 11 may be provided with first connection positions 13 to facilitate fixed connection between the support body 1 and the floating body 2 or between two support bodied. The support frame 11 is further provided with a second connection position 14, for being connected to the support assembly 4 for securing the photovoltaic module 3.

Reference is made to FIGS. 4 and 5, the support assembly 4 may include a first support plate 41, a second support plate 42 and a securing frame 43, where the first support plate 41 and the second support plate 42 may be arranged at two opposite sides of the support body 1, and are secured to the second connection positions 14. In addition, one of the first support plate 41 and the second support plate 42 is higher and the other one is lower, in which case the securing frame 43 arranged on the two support plates may be tilted at a predetermined angle relative the horizontal surface, so that the photovoltaic module 3 arranged on the securing frame 43 can better receive the sunlight, thereby guaranteeing the efficiency of photovoltaic power generation. The above "predetermined angle" is not limited herein, which is related to the latitude, the longitude and a sunlight illumination angle at the location where the photovoltaic module is installed, and may be set by those skilled in the art according to the actual situation. It should be understood that, due to the above predetermined angle, sunlight can pass through the through holes A arranged on the support body 1, be reflected and incident on the back surface of the photovoltaic module 3.

In use, whether the support body 1 is completely immersed into water or not, the photovoltaic module 3 mounted and secured through the support assembly 4 must be kept at a certain safe distance from the water surface, to avoid immersion of the photovoltaic module 3 by water due to winds or surges. The above "safe distance" may be set depending on the actual condition of the water surface above which the photovoltaic module 3 is mounted. If the water surface is quiet, the above safe distance may be smaller, and if waves are frequent, the above safe distance may be greater.

Reference is made to FIGS. 6 and 7. The floating body 2 may include a housing which includes a sealed buoyancy cavity. The housing may be formed by hollow blow molding. A remained second process hole 23 generated in the blow molding process may be sealed by using a sealing component to prevent water from entering the floating body 2 such that buoyancy provided by the floating body 2 is weakened or even lost.

The floating body 2, in addition to functioning as a buoyancy unit, may also be used for providing a maintenance channel, thereby facilitating maintenance of the photovoltaic module 3. Therefore, the floating body 2 also needs to have certain strength to avoid damage due to outside pressures.

For this, the floating body 2 may also be provided with a support structure so as to support an upper wall (a wall for people to walk) of the floating body 2. As shown in FIG. 7, in the embodiment of the present disclosure, the support structure may be a tapered support structure 21, of which an end with a greater diameter may be connected to a lower wall of the floating body 2, and an end with a smaller diameter may be connected to the upper wall of the floating body 2 so as to support the upper wall. Alternatively, the support structure may also be a reinforcement plate, a reinforcement rib or other forms of support components arranged within the floating body 2 and connected between the upper wall and the lower wall.

Moreover, an anti-slipping structure 24 may also be arranged on an upper surface of the floating body 2 so as to increase a friction coefficient of the upper surface of the floating body 2, thereby increasing a friction between foot of the staff and the upper surface of the floating body 2, such that the staff may be prevented from slipping when walking on the floating body 2.

Four corners of the floating body 2 may be provided with floating body connection positions 22 for being connected to the support body 1. As shown in FIG. 8, the first connection position 13 of the support body 1 and the floating body connection position 22 of the floating body 2 may be stacked, and connected by using bolts, pins and other forms of connectors, for connecting the support body 1 with the floating body 2. In addition to the embodiment shown in FIG. 8, other ways may be adopted for connecting the support body 1 and the floating body 2. For example, a connector may be directly secured on one of the first connection position 13 and the floating body connection position 22. The connector passes through the other one of the first connection position 13 and the floating body connection position 22 so as to connect and secure the support body 1 with the floating body 2.

Figure 9:
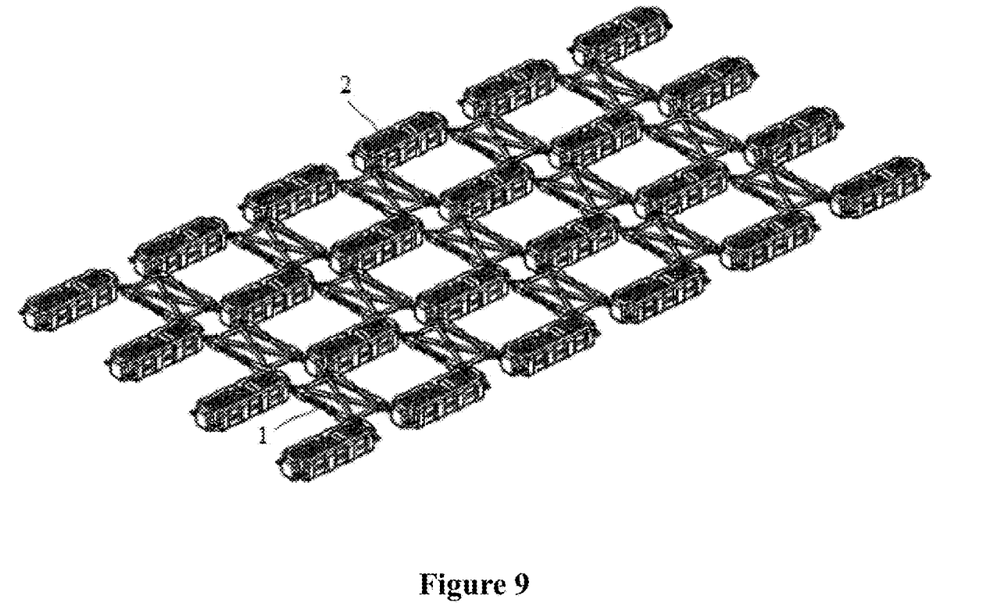
FIG. 9 is a schematic structural diagram of a support array according to an embodiment.
Figure 10:
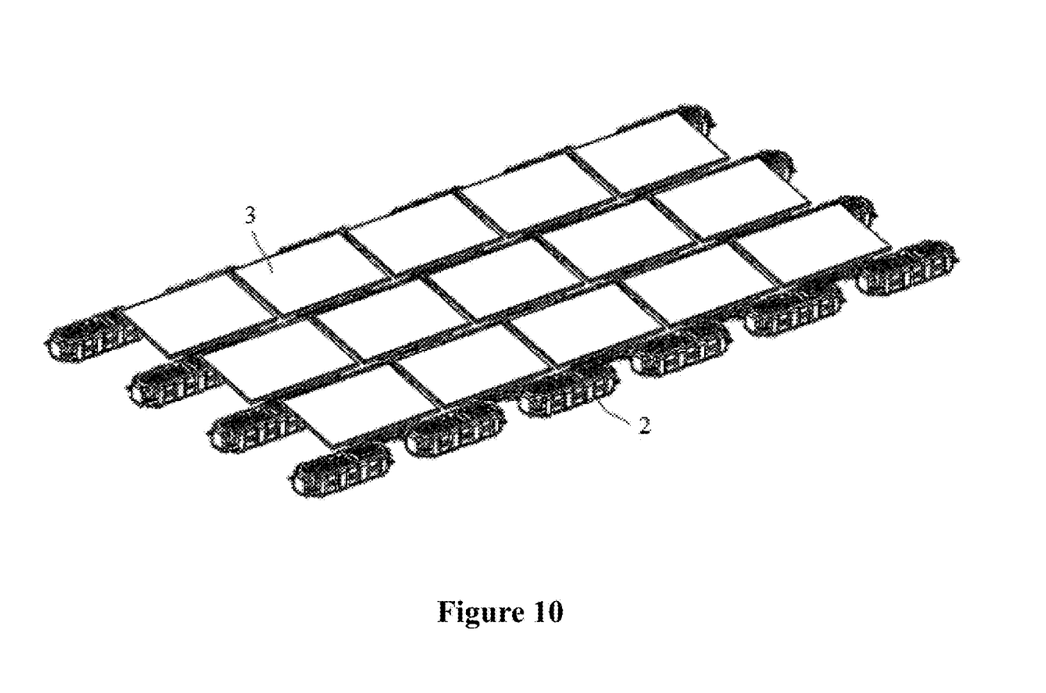
FIG. 10 is a schematic structural diagram illustrating connection between the support array shown in FIG. 9 and a photovoltaic module according to an embodiment.
Figure 11:
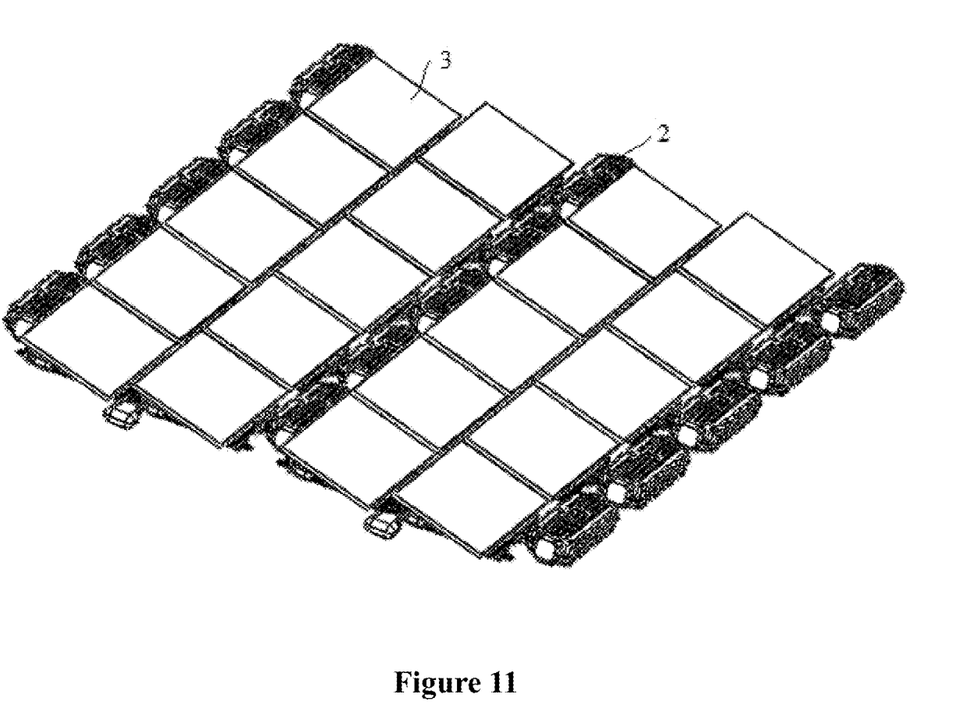
FIG. 11 is a schematic structural diagram illustrating connection between a support array and a photovoltaic module according to another embodiment.
Figure 12:
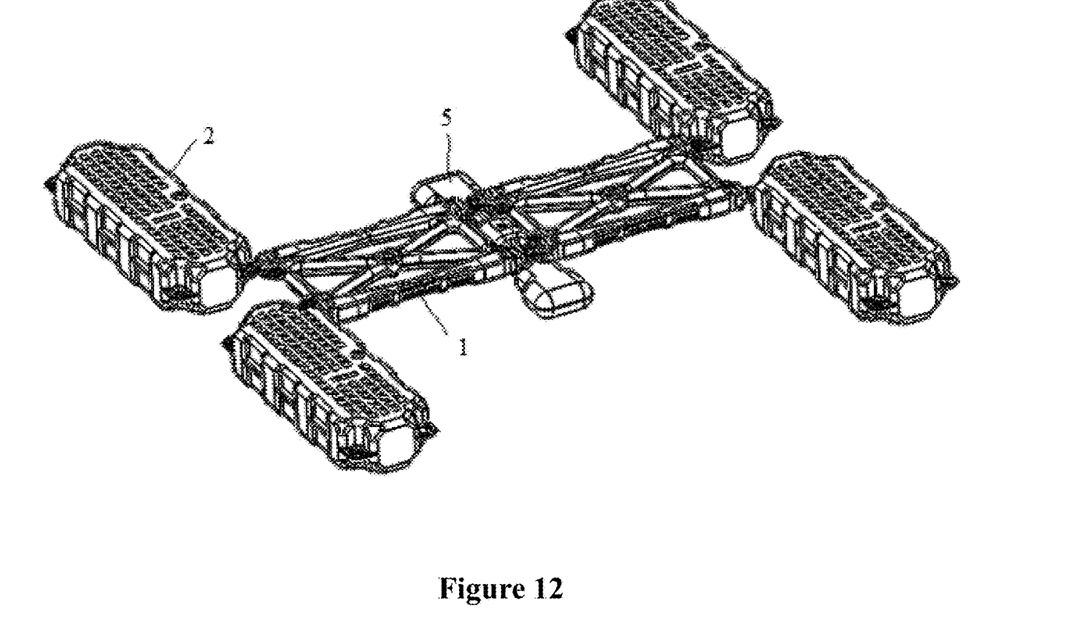
FIG. 12 is a schematic structural diagram of the support apparatus shown in FIG. 11.
Figure 13:
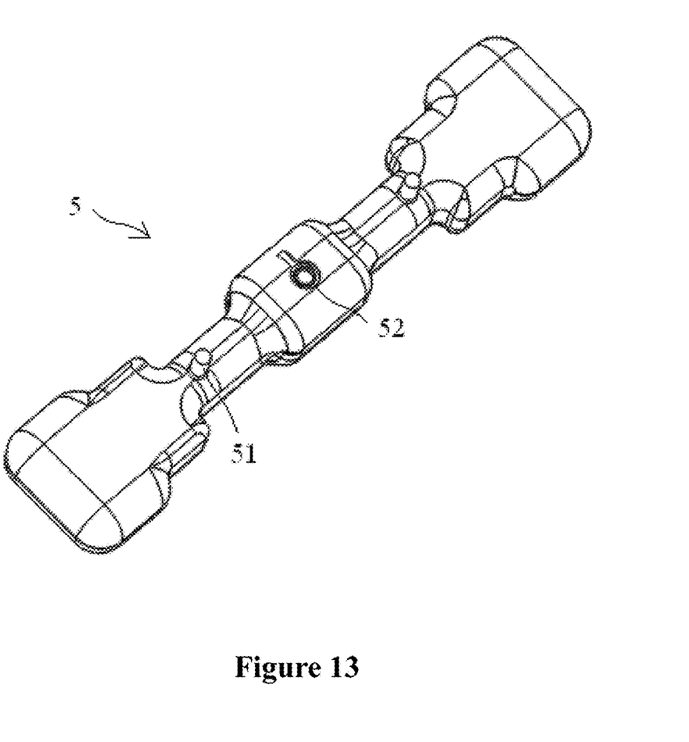
FIG. 13 is a schematic structure diagram of a double coupler.
Figure 14:
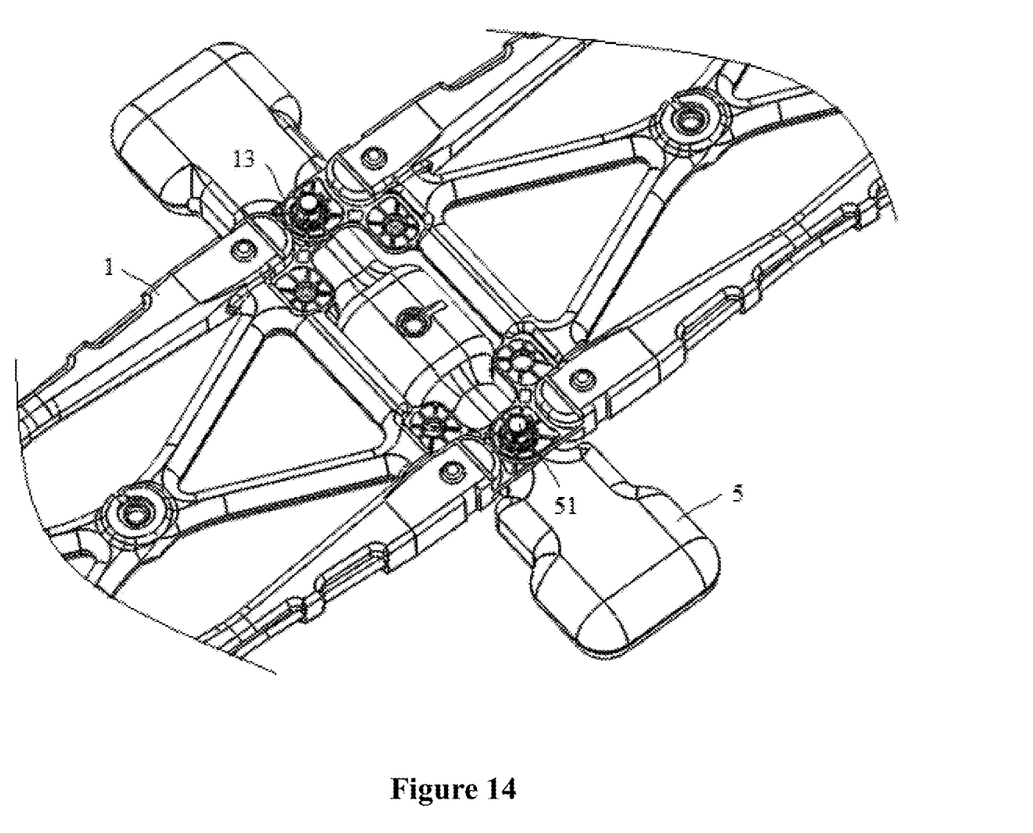
FIG. 14 is a partially enlarged view of a connection portion between a double coupler and two support bodies.

For the support apparatus for a photovoltaic module according to the above embodiments, a photovoltaic system is further provided according to the present disclosure, which includes: the photovoltaic module 3 and the above support apparatus. Reference is made to FIGS. 9 to 14. FIG. 9 is a schematic structural diagram of a support array according to an embodiment. FIG. 10 is a schematic structural diagram illustrating connection between the support array shown in FIG. 9 and a photovoltaic module according to an embodiment. FIG. 11 is a schematic structural diagram illustrating connection between a support array and a photovoltaic module according to another embodiment. FIG. 12 is a schematic structural diagram of the support apparatus shown in FIG. 11. FIG. 13 is a schematic structure diagram of a double coupler. FIG. 14 is a partially enlarged view of a connection portion between a double coupler and two support bodies.

Reference is made to FIGS. 9 to 14. Multiple support bodies 1 and multiple floating bodies 2 may be provided, and may be combined to form a grid-shaped support array. Rows of the support array may include multiple support bodies 1 for supporting the photovoltaic module 3, and columns of the support array may include the multiple floating bodies 2 which function as the maintenance channel. Each grid may be referred to as a support unit. Taking a square grid as an example, one pair of opposite sides of the grid includes only the floating bodies 2, and the other pair of opposite sides of the grid includes only the support bodies 1. The above grid-shaped support array are not limited to the square grid, and may also be set to have other shapes such as rectangular or rhomboids, depending on the actual needs.

In a first embodiment, as shown in FIGS. 9 and 10, the four corners of one support body 1 may be connected to four floating bodies 2. Also, the four corners of one floating body 2 may be connected to four support bodies 1. In this support array, each support unit includes two support bodies 1 and two floating bodies 2, the number of the floating bodies 2 is greater, such that greater buoyancy can be provided. A column of photovoltaic modules 3 may be arranged between two columns of floating bodies 2.

In a second embodiment, as shown in FIGS. 11 and 12, each row of the support bodies 1 connected between two columns of the floating bodies 2 includes at least two support bodies 1 (which may be referred to as n support bodies, where n≥2, for convenience of description), n support bodies 1 in each row may be connected in series to form a support group, two opposite ends of which are respectively connected to the two columns of floating bodies 2. In this support array, each support unit includes 2n support bodies 1 and two floating bodies 2, and n support bodies 1 of the 2n support bodies 1 are connected in series to form a side of the support unit. In this way, n columns of photovoltaic modules 3 may be installed between two columns of floating bodies 2. Space utilization of the water surface is higher and more photovoltaic modules 3 may be installed. An installation density of the photovoltaic module 3 is higher, which is helpful to increase the photovoltaic power generation amount.

For convenience of repairing the each row of photovoltaic modules 3 through the maintenance channel formed by the floating bodies 2, in the embodiment of the present disclosure, the above n preferably equals 2, that is, between two columns of floating bodies 2, each of rows of support bodies 1 includes two support bodies. The two support bodies 1 may be connected at adjacent ends of the two support bodies 1, and opposite ends of the two support bodies 1 are connected with two columns of floating bodies 2.

Comparatively speaking, in the first embodiment, more floating bodies 2 can be provided, such that greater buoyancy can be provided. In the second embodiment, the installation density of the photovoltaic module 3 is greater and the photovoltaic power generation amount is greater. In practical applications, those skilled in the art may select the above two embodiments to arrange the support bodies 1 and the floating bodies 2 based on actual needs. Of course, besides the above embodiments, other embodiments may also be adopted. For example, each support unit may include four floating bodies 2 and two support bodies 1, where each two of the four floating bodies 2 are connected to form one side of the support unit to provide greater buoyancy.

In the above second embodiment, the adjacent two support bodies 1 may be fixedly connected through a double coupler 5, as shown in FIGS. 13 and 14, the double coupler 5 may be formed by hollow blow molding and may be provide with a third process hole 52, where the third process hole 52 may be blocked or not blocked, which may be determined based on whether the support body 1 is to provide buoyancy. The double coupler 5 is provided with a sub-connector 51, where the sub-connector 51 may specifically be a stud, a pin or the like. Two first connection positions 13 of the two support bodies 1 may be stacked, and the sub-connector 51 passes through the two first connection positions 13 so as to fixedly connect the two support bodies 1 in combination with a nut, a position control wire and other components. In addition to the above double coupler 5, other connection members such as bolts may be used for fixedly connecting the two support bodies 1.

The above only describes preferred embodiments of the present disclosure, it should be noted that those skilled in the art may, without departing from the principle of the disclosure, make many possible changes and modifications to the technical solution of the present disclosure, therefore, these changes and modifications still falls within the protection scope of the disclosure.

The invention claimed is:

1. A support apparatus for a photovoltaic module having a front surface and a back surface that are each configured for photovoltaic power generation, comprising:
   a support body for mounting the photovoltaic module; and
   a floating body connected to the support body and configured to provide buoyancy for the support apparatus such that the support apparatus is configured to float on a water surface,
   wherein the support body comprises a support frame and a plurality of reinforcement beams arranged in the support frame, a plurality of vertically-extending through holes are formed between the plurality of reinforcement beams, and between the plurality of reinforcement beams and edge beams of the support frame, and
   the vertically-extending through holes are each configured to permit sunlight to pass therethrough to be incident on the water surface and reflect back from the water surface to be incident on the back surface of the photovoltaic module.

2. The support apparatus for a photovoltaic module according to claim 1, wherein
   at least one of the support body and the floating body is provided with a reflective coating.

3. The support apparatus for a photovoltaic module according to claim 1, wherein the support body is not configured to provide buoyancy.

4. The support apparatus for a photovoltaic module according to claim 1, wherein the support frame and the plurality of reinforcement beams are in an integrated structure.

5. The support apparatus for a photovoltaic module according to claim 1, wherein the edge beams of the support frame are provided with a reinforcement structure.

6. The support apparatus of a photovoltaic module according to claim 1, wherein one of an upper surface and a lower surface of the support frame is provided with a positioning protrusion, the other one of the upper surface and the lower surface of the support frame is provided with a positioning groove corresponding to the positioning protrusion;
   in a case where a plurality of support bodies are stacked, the positioning protrusion of one of two adjacent support bodies is inserted in the positioning groove of the other one of the two adjacent support bodies.

7. The support apparatus for a photovoltaic module according to claim 1, further comprising: a support assembly, wherein the support assembly is arranged on the support body and configured to position the photovoltaic module above the water surface.

8. The support apparatus for a photovoltaic module according to claim 2, further comprising: a support assembly, wherein the support assembly is arranged on the support body and configured to position the photovoltaic module above the water surface.

9. The support apparatus for a photovoltaic module according to claim 1, wherein the floating body comprises:

a housing comprising a sealed buoyancy cavity; and
a support structure configured to support an upper wall of the housing.

10. A photovoltaic system, comprising:
a photovoltaic module; and
the support apparatus according to claim 1, wherein
the photovoltaic module is mounted on the support apparatus.

11. The photovoltaic system according to claim 10, comprising a plurality of support bodies and a plurality of floating bodies which form a grid-shaped support array, wherein
rows of the grid-shaped support array comprise the plurality of support bodies, and columns of the grid-shaped support array comprise the plurality of floating bodies; and
a column of the floating bodies forms a maintenance channel.

12. The photovoltaic system according to claim 11, wherein each row of the support bodies connected between two columns of the floating bodies comprises at least two support bodies which are connected in series.

13. A support apparatus for a photovoltaic module having a front surface and a back surface that are each configured for photovoltaic power generation, comprising:
a support body configured for mounting the photovoltaic module; and
a floating body connected to the support body, and configured to provide buoyancy for the support apparatus,
wherein the support body comprises a support frame and a plurality of reinforcement beams arranged in the support frame, a plurality of vertically-extending through holes are formed between the plurality of reinforcement beams, and between the plurality of reinforcement beams and edge beams of the support frame, and
the floating body is configured to provide buoyancy for the support apparatus such that when the support body is immersed in water, sunlight that is incident on a surface of the water is reflected by the water surface to the back surface of the photovoltaic module.

14. The support apparatus for a photovoltaic module according to claim 13, wherein the support body is not configured to provide buoyancy.

15. The support apparatus for a photovoltaic module according to claim 13, further comprising:
a support assembly arranged on the support body and configured to position the photovoltaic module above the water surface.

16. A photovoltaic system, comprising:
a photovoltaic module; and
the support apparatus according to claim 13,
wherein the photovoltaic module is mounted on the support apparatus.

17. The photovoltaic system according to claim 16, comprising a plurality of support bodies and a plurality of floating bodies which form a grid-shaped support array,
wherein rows of the grid-shaped support array comprise the plurality of support bodies, and columns of the grid-shaped support array comprise the plurality of floating bodies; and
a column of the floating bodies forms a maintenance channel.

18. The photovoltaic system according to claim 17, wherein each row of the support bodies connected between two columns of the floating bodies comprises at least two support bodies which are connected in series.

* * * * *